United States Patent [19]

Bartlett

[11] Patent Number: 4,711,337

[45] Date of Patent: Dec. 8, 1987

[54] ARTICLE FEEDER RING FOR USE IN A VIBRATORY BOWL FEEDER

[75] Inventor: Maynard L. Bartlett, Farmington, Conn.

[73] Assignee: The Arthur G. Russell Company, Inc., Bristol, Conn.

[21] Appl. No.: 945,783

[22] Filed: Dec. 23, 1986

[51] Int. Cl.⁴ .............................................. B65G 27/02
[52] U.S. Cl. ..................................... 198/391; 198/392
[58] Field of Search ............... 198/391, 392, 396, 443, 198/803.16; 221/160, 167

[56] References Cited

U.S. PATENT DOCUMENTS

| | | | |
|---|---|---|---|
| 2,949,998 | 8/1960 | Whitecar | 198/396 |
| 3,330,403 | 7/1967 | Roberts et al. | 198/392 |
| 3,578,142 | 5/1971 | Burgess, Jr. | 198/391 X |
| 3,655,028 | 4/1972 | Hodgins | 198/391 |
| 3,726,385 | 4/1973 | Sterling | 198/392 |
| 3,743,075 | 7/1973 | Brackmann et al. | 198/392 X |
| 3,826,405 | 7/1974 | Hoppman et al. | 221/160 X |
| 4,245,733 | 1/1981 | Kubota et al. | 198/391 |
| 4,453,626 | 6/1984 | Roberts et al. | 198/391 |

Primary Examiner—Joseph E. Valenza
Assistant Examiner—Cheryl L. Gastineau
Attorney, Agent, or Firm—McCormick, Paulding and Huber

[57] ABSTRACT

Apparatus for orienting and feeding axially elongated articles includes a feeder bowl with an article ramp surface terminating at the upper edge of the bowl and an annular article feeder ring, supported for rotation around an upper portion of the feeder bowl, has an upwardly facing article supporting surface contiguous with a terminal portion of the ramp surface to receive articles therefrom. A stationary ring is arranged within a recess in the article supporting surface of the article feeder ring and includes an upwardly facing article supporting surface substantially continuous and planar with the supporting surface of the feeder ring. A radial groove within the article supporting surface of the stationary ring accepts a guide conveyor which directs the articles tangentially away from the article feeder ring.

2 Claims, 8 Drawing Figures

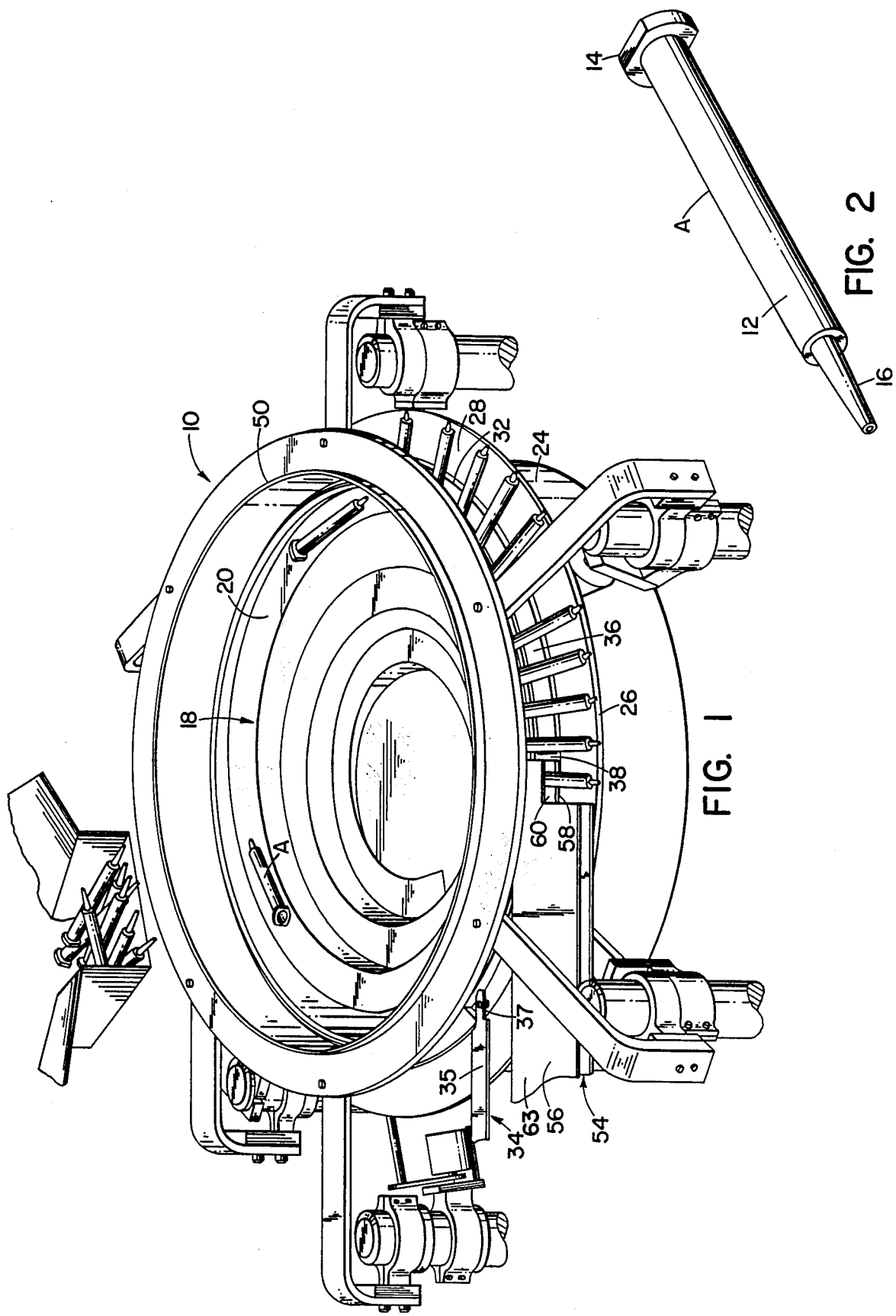

ARTICLE FEEDER RING FOR USE IN A VIBRATORY BOWL FEEDER

BACKGROUND OF THE INVENTION

This invention relates in general to article feeding devices and deals more particularly with an improved article feeder of the vibratory bowl type having a bowl formed with a helical ramp along which articles to be fed travel in response to vibration of the bowl. This invention more specifically relates to vibratory bowl feeders for orienting and feeding axially elongated articles in axially side-by-side relation to each other wherein each article has an axially elongated body and a radially enlarged portion axially spaced from at least one end of the body. The present invention is particularly concerned with an improved article feeder ring used with a vibratory bowl feeder.

A vibratory bowl feeder of the specific type with which this invention is concerned is disclosed in U.S. Pat. No. 4,453,626 issued June 12, 1984 to Roberts, et al., and assigned to the same assignee as the present invention. In that feeder a supply of articles loosely contained within a feeder bowl are discharged upwardly by means of a peripheral ramp leading to a gated outer rim through which articles are successively discharged in a generally radial direction to a rotating annular ring surrounding a portion of the outer periphery of the feeder bowl to provide a contiguous surface with the terminal portion of the ramp. The ring has formed therein a relatively large annular groove to receive a tangentially extending take-away conveyor for successively discharging the articles carried on the ring.

It is often desirable to increase the rate at which articles are discharged especially if the vibratory bowl feeder cooperates directly with other equipment to feeder articles to the equipment. Generally, the discharge rate is increased by increasing the amplitude and/or duration of operation of the vibratory bowl to flood the discharge area at the gated outer rim area. Although such flooding may be suitable as one way for increasing the discharge rate of articles having a relatively large cross-sectional body diameter, it is totally unacceptable when the articles have smaller cross-sectional body diameters especially in those instances when the diameter of the article is less than the depth of the annular groove in the rotating take-away ring. The discharge rate of such smaller diameter article bodies is often reduced substantially below a desired discharge rate to avoid a discharged article from becoming lodged in the annular groove and beneath the body of another article being carried on the ring surface. Occasionally, such lodging of one article beneath another jams the discharge area and prevents the further discharge of articles.

Consequently, it would be desirable in a vibratory bowl feeder to prevent one article from becoming lodged beneath the body of another article carried on the surface of the take away-ring.

It is a general object of the present invention therefore, to provide an improved take-away ring for use in a vibratory bowl feeder apparatus for feeding a continuous supply of axially elongated articles oriented in axially side-by-side relation that overcomes the aforementioned drawbacks and disadvantages of take-away rings used with the above described vibratory bowl feeder.

Other objects and advantages of the present invention will be readily apparent from the following description of a preferred embodiment taken in conjunction with the drawings forming a part thereof.

SUMMARY OF THE INVENTION

In accordance with the present invention, an improved article feeder ring is provided for use with a vibratory bowl feeder of the general type used for orienting and feeding axially elongated articles wherein each article has an axially elongated body portion and a radially enlarged portion axially spaced from at least one end of the body. A generally helical track surface extends along the inner periphery of the feeder bowl which bowl loosely contains the articles and has a terminal portion which extends along an associated portion of the upper edge of the bowl. A drive mechanism is provided for vibrating the feeder bowl to move articles contained within a central portion of the bowl onto and along the track surface in one direction and in generally axial end-to-end relation to each other.

An annular take-away ring surrounds the upper edge portion of the feeder bowl and has an upwardly facing article supporting surface contiguous with the terminal portion of the track surface for receiving articles from the terminal portion. The take-away ring is supported around and relative to the feeder bowl for rotation by a drive means. A stationary ring is adapted to fit within an annular recess in the article supporting surface of the take-away ring and is located intermediate the circumferential edges of the ring. The stationary ring has an upwardly facing article supporting surface coextensive with the article supporting surface of the take-away ring which together with the supporting surface of the take-away ring provides a substantially continuous support surface beneath and in close proximity to the body of an article carried on the take-away ring.

A radial groove is formed within the article supporting surface of the stationary ring to receive a tangentially arranged take-away means for successively receiving the articles in side-by-side orientation from the supporting surface of the take-away ring.

BRIEF DESCRIPTION OF THE DRAWINGS

FIG. 1 is a perspective view of a vibratory bowl feeder embodying the present invention and containing articles to be fed.

FIG. 2 is a somewhat enlarged perspective view of an article such as shown in FIG. 1.

DETAILED DESCRIPTION OF A PREFERRED EMBODIMENT

Figure 3:
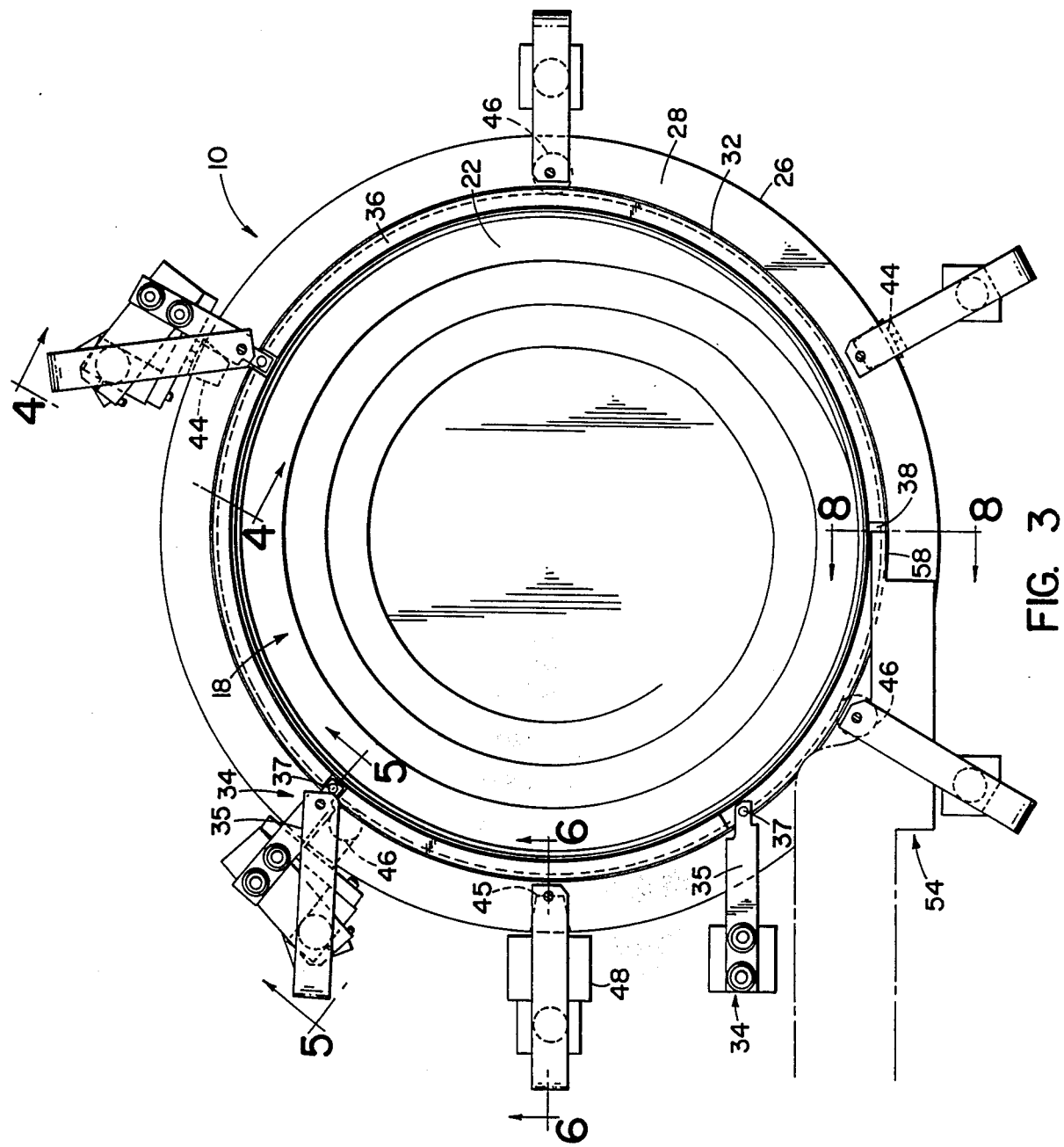
FIG. 3 is a plan view of the vibratory feeder shown in FIG. 1.

Turning now to the drawings and considering FIGS. 1-3 a vibratory feeding apparatus of the type with which the take-away ring of the present invention is uses is shown in FIGS. 1 and 3 and indicated generally 10. The apparatus 10 is particularly adapted for orienting and feeding a continuous succession of axially elongated articles, such as the articles indicated at A,A in the drawings.

A typical article A is illustrated in somewhat further detail in FIG. 2 and often comprises generally cylindrical body portion 12 and a radially enlarged flange portion 14. The article A may be made of any material, such as, for example, plastic, metal or any other compositions. For purposes of illustration only the article A in FIG. 2 includes an axially elongated nozzle portion 16 projecting coaxially from the opposite end of the body portion 12.

The vibratory feeding apparatus 10, includes a feeder bowl indicated generally 18 which has a central portion for containing a supply of articles, such as, the articles A,A. A helical track surface or ramp 20 spirls upwardly and outwardly from the central portion along the inner peripheral surface of the bowl 18. The track surface 20 is inclined radially outwardly and downwardly relative to the axis of bowl 18, is wide enough to accommodate a single article A, and terminates in an arcuate terminal portion 22 at the upper edge of the bowl 18 as best shown in FIG. 3.

The feeder bowl 18 is mounted on a base 24 which is supported on adjustable legs and contains a vibratory drive mechanism of a well known type, not shown. The drive mechanism vibrates the feeder bowl 18 to move articles, such as, the articles A,A onto and along the track surface 20 in generally axial end-to-end relation to each other. Reference may be had to U.S. Pat. No. 4,453,626 to Roberts, et al. entitled VIBRATORY FEEDING APPARATUS issued June 12, 1984 and assigned to the same assignee as the present invention, for further details of the construction and operation of such a vibratory bowl feeder and which patent is hereby incorporated by reference.

Figure 7:
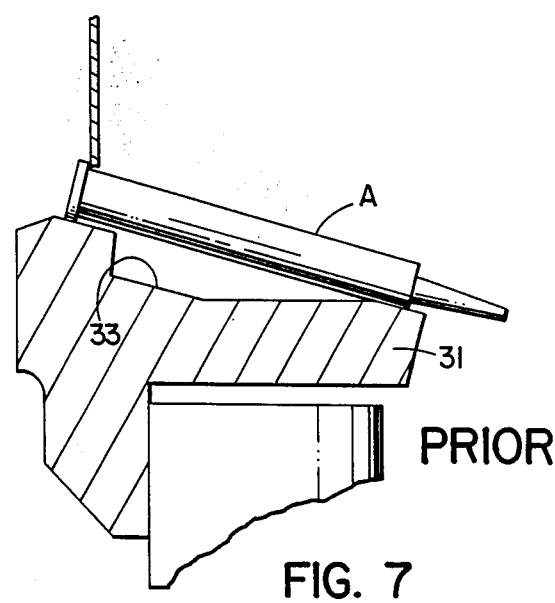
FIG. 7 is a somewhat enlarged sectional view of a prior art take-away ring used with vibratory bowl feeders.

Referring for a moment to FIG. 7, an annular take-away ring, such as, the type used in the vibratory feeding apparatus disclosed in the above-referenced patent is shown and designated 31. The ring 31 has a coaxial annular groove 33 formed in the article supporting surface of the ring. The groove 33 has a radially elongated and gradually sloping inner contour to accept a guide plate extension associated with a take-away conveyor for successfully discharging the articles from the annular take-away ring 31. As can be seen, an article having a relatively small cross-sectional body diameter, such as, for example, less than the height of the groove 33, can become partially lodged within the groove and beneath the body portion 12 of an article being carried on the take-away ring 31.

Figure 4:
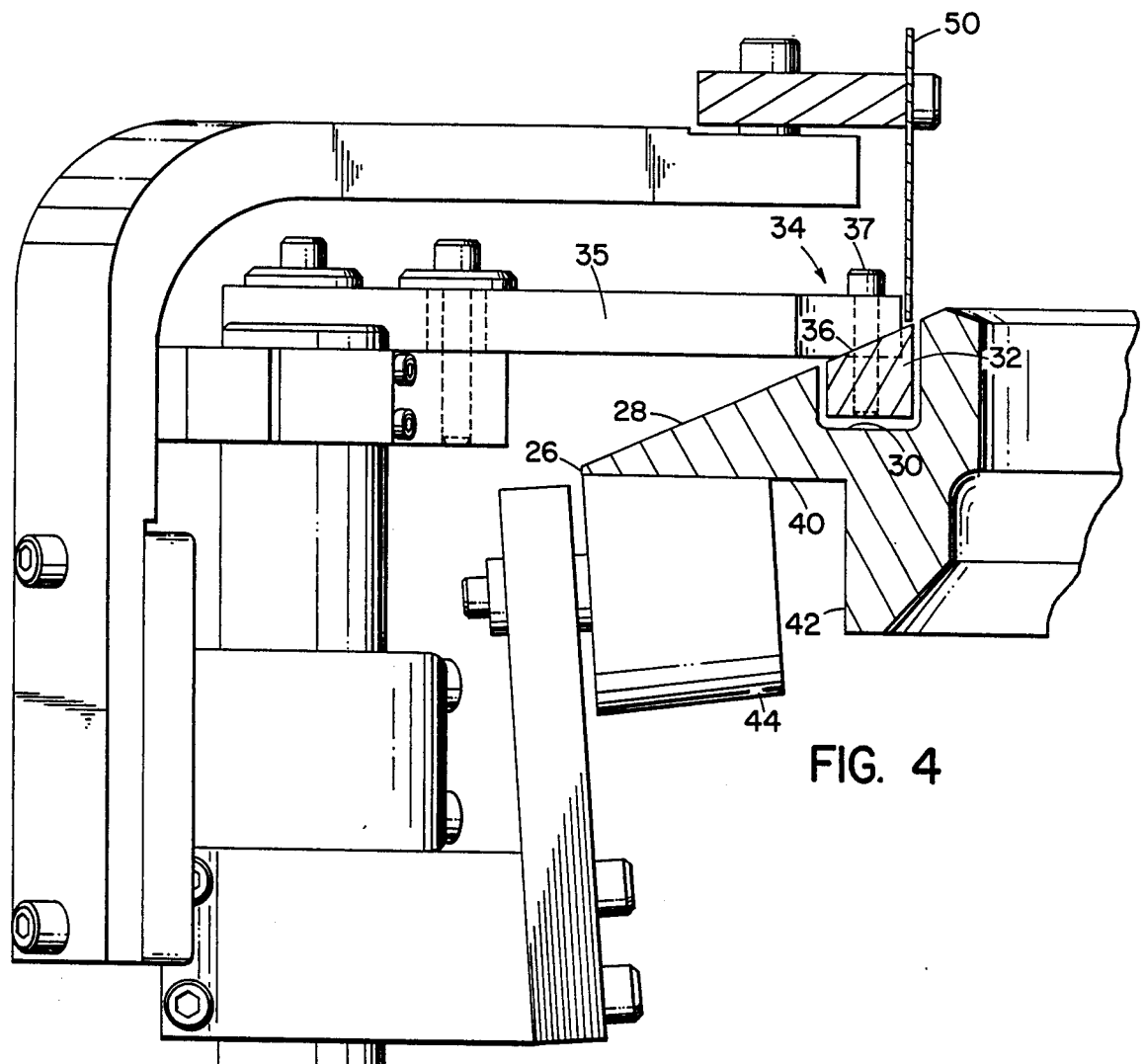
FIG. 4 is a somewhat enlarged fragmentary sectional view taken along the line 4—4 of FIG. 3.
Figure 5:
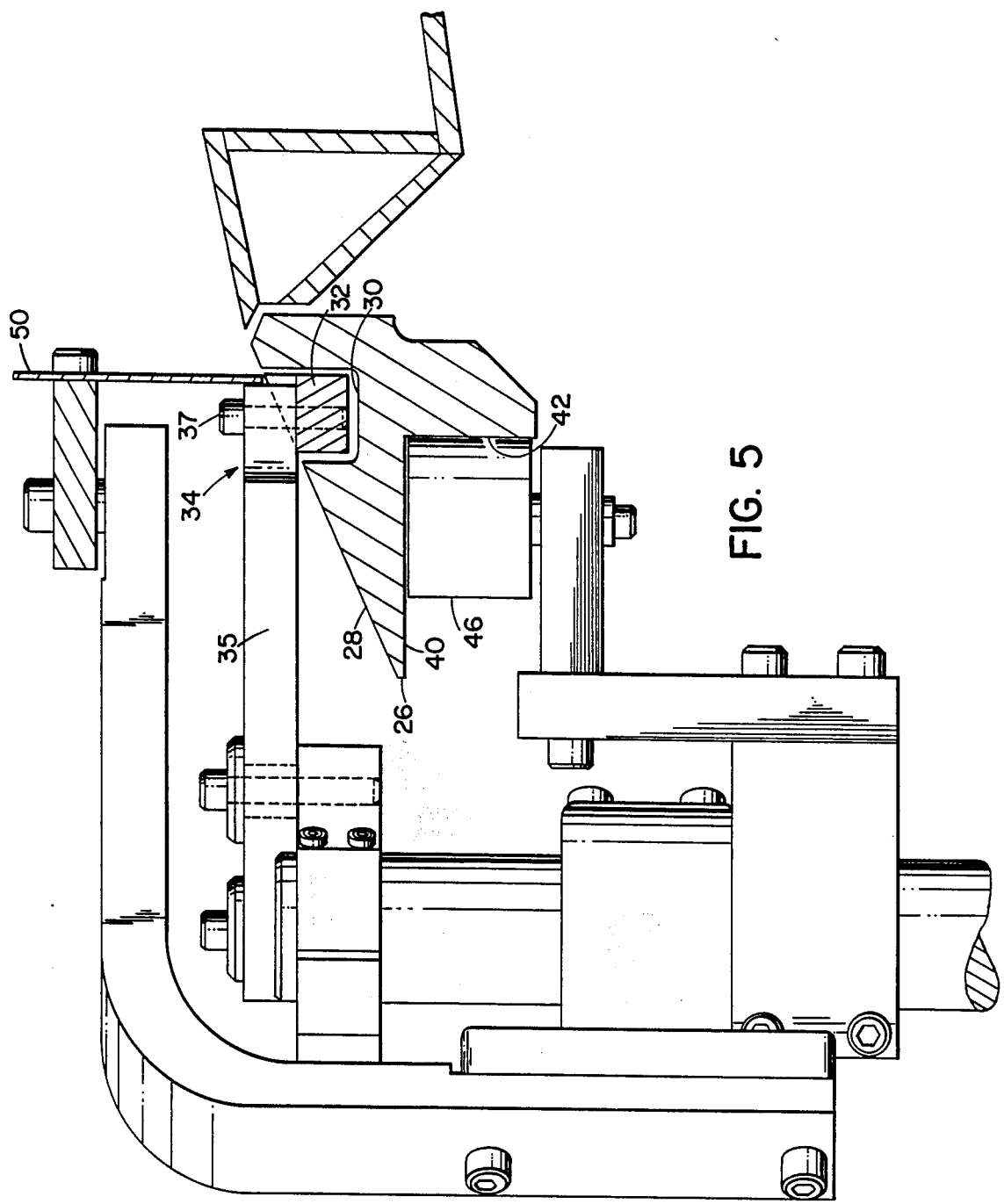
FIG. 5 is a somewhat enlarged fragmentary sectional view taken along the line 5—5 of FIG. 3.

Considering now the invention in further detail and referring to FIGS. 1–6 and 8, an annular take-away ring 26 embodying the invention is indicated generally 26. As shown in FIGS. 1 and 3, the take-away ring 26 surrounds the upper edge portion of the feeder bowl 18 and has an upwardly facing article supporting surface 28. The surface 28 is contiguous to the track surface terminal portion 22 and inclined radially outwardly and downwardly relative to the central axis of the feeder bowl as best shown in FIGS. 4 and 5.

Figure 6:
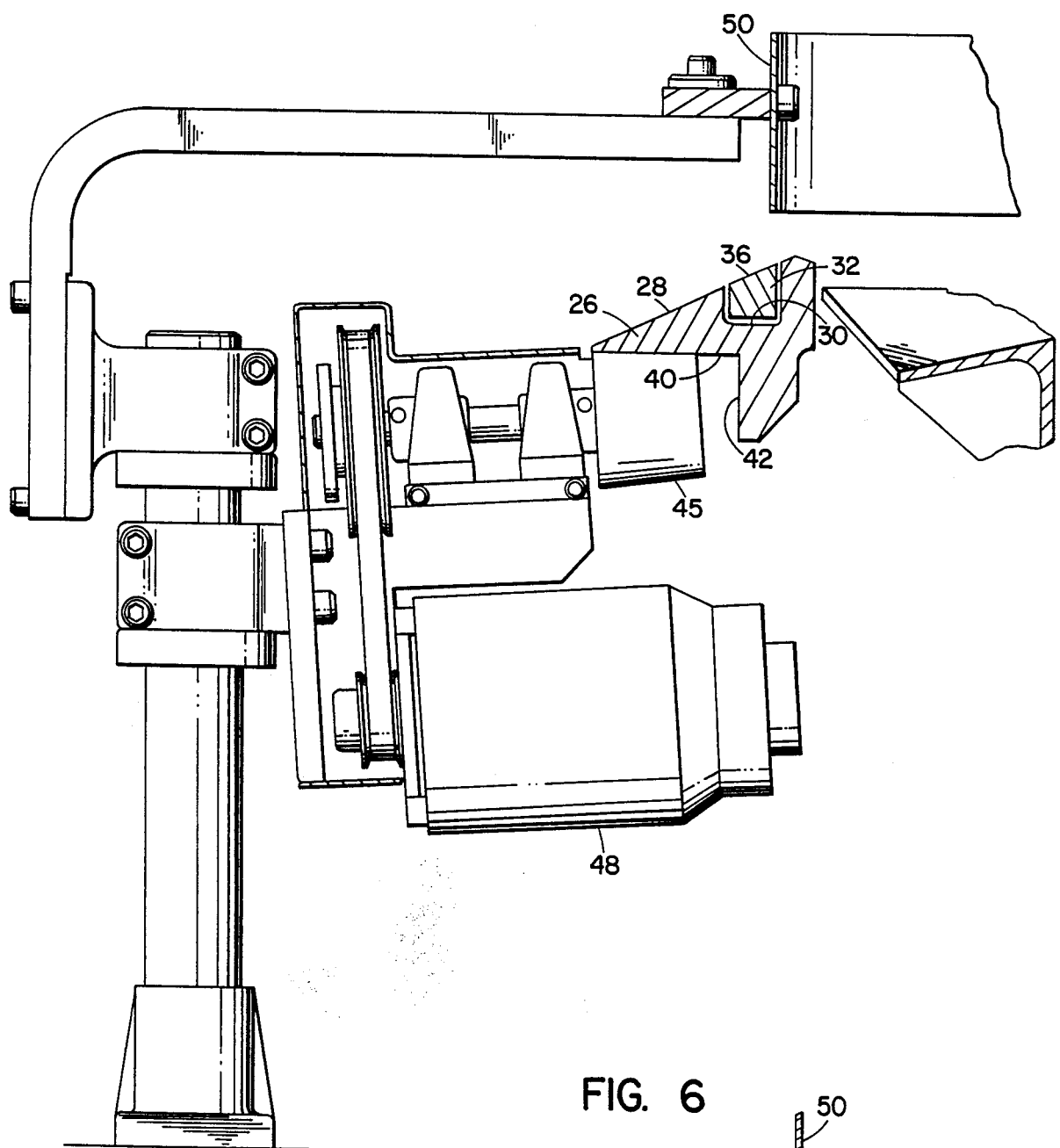
FIG. 6 is a somewhat enlarged fragmentary sectional view taken along the line 6—6 of FIG. 3.

The take-away ring 26 includes a lower portion partially defined by a substantially radially disposed and downwardly facing lower surface 40 and a radially outwardly facing annular surface 42. Lower surface 40 rests upon a series of angularly spaced support rollers 44,44 and 45 which support the ring 26 for rotation about the vertical axis of the feeder bowl 18. The roller 45 is driven by a belt and pulley mechanism powered by a drive motor 48, as shown in FIG. 6. The surface of the roller 45 frictionally engages the surface 40 of the ring 26 to rotate the ring. The take-away ring 26 is further supported by three equiangularly spaced support rollers 46,46 for rotation about vertical axes and engaged with the annular surface 42 to limit lateral movement of the ring 26 as the ring rotates.

Figure 8:
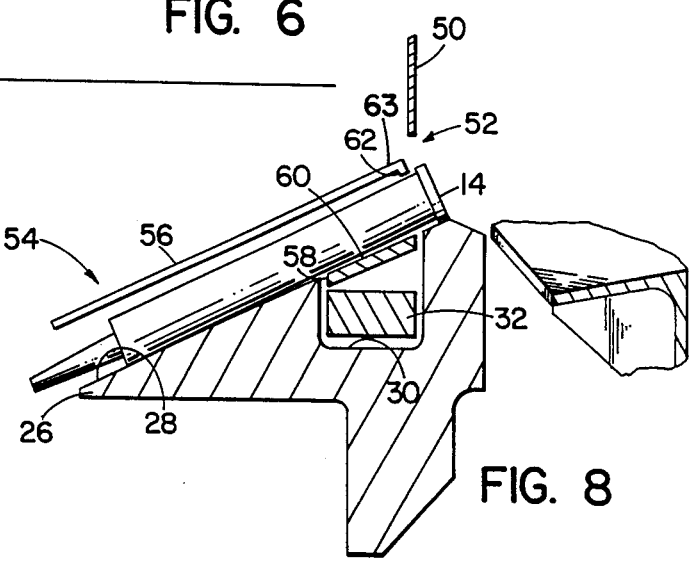
FIG. 8 is a somewhat enlarged fragmentary sectional view taken along the line 8—8 of FIG. 3.

An annular baffle 50 is coaxially mounted in a fixed position above the take-away ring 26. Preferably, baffle 50 has an inside diameter somewhat larger than the inside diameter of the ring 26, and is spaced above an associated portion of the article supporting surface 28 a distance greater than the cross-sectional dimension of the article body portion 12, but less than the minor dimension of the enlarged flange 14. A downwardly opening gate slot 52 formed in the baffle 50 opens through the lower edge of the baffle at the discharge region, which discharge region is angularly spaced from the region of the track terminal portion 22. The upper edge of the gate slot 52 is sufficiently spaced above the article support surface 28 to allow the radially enlarged flange portion 14 of the article to pass therethrough as shown in FIG. 8.

The take-away ring 26 includes an annular groove 30 concentric with the ring 26 and intermediate the inner and outer circumferential edges of the ring. The groove 30 extends downwardly from the article supporting surface 28 of the ring 26. A stationary ring indicated generally 3 and best shown in FIGS. 1 and 3, is adapted to fit within the groove 30 in the take-away ring 26 and is held stationary relative to the movement of the take-away ring. Typically, the stationary ring 32 is held in place at spaced circumferential point by an assembly shown generally at 34 and which assembly includes a cantilevered support 35 mounted at one end to the apparatus supporting structure and connected by a suitable connector or bolt 37 at its opposite end to the ring 32. The stationary ring 32 includes an upwardly facing article supporting surface 36 which, when the ring 32 is held in place, is coincident with the article supporting surface 28. The combined supporting surfaces of the take-away ring 36 and the stationary ring 32 are arranged to form a substantially planar and continuous article supporting surface extending radially outwardly and downwardly relative to the central axis of the feeder bowl.

The stationary ring 32 further includes a radial groove 38 opening upwardly in the article supporting surface 36. The groove 38 is located in the gated discharge region of the vibratory feeder bowl and is angularly spaced from the region of the track terminal portion 22 in a direction corresponding to the direction of article movement. The groove 38 is formed to accept the input portion or apron of a take-away conveyor discussed in further detail below.

The take-away conveyor indicated generally 54, is mounted in a fixed position in the discharge region and extends in a generally tangential direction relative to the article support surfaces 28 and 36 and the take-away ring 26. The conveyor 54 has a frame assembly indicated generally 56, which assembly defines a guide track for receiving articles A,A from the article support surface 28. The frame 56 includes a tangentially extending guide plate apron 58 which has a generally upwardly facing guide surface 60. The entry end of the guide plate 58 is arranged to fit in the radial groove 38, as best shown in FIGS. 1 and 8, and is arranged so that the surface 60 is substantially contiguous to the article supporting surfaces 28 and 36 of the take-away and stationary rings respectively. The frame 56 and its associated guide plate 58 are inclined downwardly and generally radially outwardly relative to the central axis of the feeder bowl 18.

Referring to FIG. 8, the frame 56 further includes a downwardly extending lip portion 62 disposed lengthwise along its upper edge 63 for engaging the upper portion of the radially enlarged flange 14 of the articles A,A to prevent the articles carried along the take-away conveyor from sliding down the inclined surface of the guide plate 58.

A vibratory drive means similar to the type used to impart vibratory motion to the feeder bowl is coupled to the conveyor frame 56 to vibrate the frame to induce movement of the articles along the guide plate 58 and away from the discharge point.

An improved article feeder ring used with a vibratory feeder bowl apparatus has been described in a preferred embodiment. Numerous changes and substitutions may be made by those skilled in the art and therefore the invention has been described by way of illustration rather than limitation.

I claim:

1. Apparatus for orienting and feeding articles of the general type having an axially elongated body portion and a radially enlarged portion axially spaced from at least one end of the body portion, said apparatus including a feeder bowl having a vertical axis, for containing a supply of the articles and having a generally helical track surface extending along the inner periphery of the bowl and which track surface has a terminal portion at the upper edge portion of the bowl and which terminal portion has a radially outer arcuate edge free of any portion of the bowl extending generally upwardly therefrom and which terminal portion of said track surface extends generally inwardly and upwardly from the arcuate outer edge, feeder bowl drive means for vibrating the bowl to move the articles onto the track surface and along the track surface in one direction of movement about the vertical bowl axis and in generally axial end-to-end relation to each other, said terminal portion of said track surface having a downstream end defining the limit of its extension in the one direction of movement about the vertical bowl axis, an annular ring concentric with the vertical bowl axis surrounding the upper edge portion of the bowl and having a generally upward by facing annular article supporting surface with an inner circular edge closely adjacent to the outer arcuate edge of the terminal portion of the track surface, the annular article supporting surface of the ring being generally in line with the terminal portion of the bowl track surface, as seen on a vertical plane passing through the supporting surface and the terminal portion of the track surface and containing the vertical bowl axis, and extending generally outwardly and downwardly from its inner circular edge to form essentially a generally radially outward extending continuation of the terminal portion of the bowl track surface for receiving articles after they move radially outwardly beyond the terminal portion, means supporting the annular ring for rotation about the vertical bowl axis, and a stationary arcuate baffle concentric with the vertical bowl axis extending circumferentially along the length of the terminal portion of the track surface and also extending for some distance beyond the downstream end of the terminal portion of the track surface in the direction of rotation of the ring, the baffle having a lower edge spaced above the supporting surface of the ring and located radially a substantial distance outwardly from the inner edge of the support surface of the ring so that a substantial portion of the supporting surface is located radially inside of the baffle and another substantial portion of the supporting surface is located radially outside the baffle, the vertical spacing between the lower edge of the baffle and the supporting surface of the ring being such as to allow the body portion of each article to pass through the space so formed and to prevent passage of its enlarged portion such that after an article moves radially outwardly from the terminal portion of the bowl track surface to the supporting surface of the ring, the body portion of the article will swing radially outwardly through the space between the lower edge of the baffle and the supporting surface and its radially enlarged portion will be restrained against further radial outward movement by engagement with the baffle, the baffle being so radially spaced outwardly from the inner edge of the supporting surface of the ring that after an article has its body swung radially outwardly through the space the portion of the supporting surface located radially inwardly of the baffle is of sufficient radial extent so as to entirely receive the radially enlarged portion of the article and the body portion is underlayed by a portion of the ring located radially outwardly of the baffle, the baffle some distance circumferentially downstream beyond the downstream end of the terminal portion of the track surface having a discharge point at which the lower edge no longer restrains the enlarged portions of the articles so that the articles are free to move from the ring support surface, said improvement comprising:

said annular ring article supporting surface including an annular groove concentric with the vertical bowl axis and located intermediate the inner circumferential edge of said annular ring and the outermost radial distance beyond the inner circumferential edge, said annular ring radially outward extending article supporting surface being substantially flat and planar along the surface between said inner edge and said groove and the outermost edge and said groove;

a ring concentric with the vertical bowl axis and adapted to fit within said annular groove in said annular ring;

means for holding said ring stationary with respect to the rotation of said annular ring;

said stationary ring having an upwardly facing article supporting surface, said stationary ring supporting surface being coincident with the article supporting surface of said annular ring so that the combined supporting surface of said annular ring and said stationary ring provide a substantially continuous, planar article supporting surface extending radially outwardly from said inner edge of said annular ring so that said article after its body portion has swung through said space is supported by and in close proximity to said annular ring and said stationary ring support surfaces along its length on opposite sides of said baffle whereby the body portion of an article swung through said space is prevented from wedging itself between said article support surfaces and the body portion of an article supported by said ring and said stationary ring support surfaces.

2. Apparatus as defined in claim 1 wherein said improvement further comprises said stationary ring having a radial groove in its article supporting surface, take-away means positioned adjacent said discharge point of said baffle for transporting said articles sidewise of themselves away from said discharge point in side-by-side orientation along a take-away path extending generally tangentially of said stationary ring and with the axes of said articles as they move along at least the initial portion of said take-away path having substantially the same inclination to the horizontal as they do while supported by said ring and said stationary ring just before reaching the discharge point, said take-away means including an elongated guideplate having an entry end portion located within said stationary ring groove at said discharge point of said baffle, said guideplate extending away from said entry end portion tangentially of said stationary ring groove to a point spaced outwardly beyond the outer edge of said stationary ring, said guideplate having a generally upwardly facing support surface located below the body portions of the articles which are brought to said entry end portion by said annular ring, and take-away means drive means for vibrating said take-away means to move articles along said take-away support surface in a direction away from said discharge point.

* * * * *